United States Patent Office 3,287,255
Patented Nov. 22, 1966

3,287,255
CRYSTALLINE SYNTHETIC ZEOLITES FOR THE HYDROCRACKING OF HYDROCARBONS
Leo Broussard, William Judson Mattox, William Floyd Arey, Jr., and Warren Alfred Knarr, Baton Rouge, and Sebastian Marc Laurent, Greenwell Springs, La., assignors to Esso Research and Engineering Company, a corporation of Delaware
No Drawing. Filed Mar. 18, 1964, Ser. No. 352,984
17 Claims. (Cl. 208—111)

This invention relates to crystalline synthetic zeolites and a process for their preparation. Particularly, it relates to crystalline synthetic alkali metal alumino-silicate zeolites wherein a portion of said alkali metal has been selectively replaced by a hydrogen-containing cation. More particularly, it relates to the use of said zeolites as catalytic agents in hydrocarbon conversion processes.

Crystalline alumino-silicate zeolites, commonly referred to as "molecular sieves," are well known in the art. They are characterized by their highly ordered crystalline structure and uniformly dimensioned pores, and are distinguishable from each other on the basis of composition, crystal structure, adsorption properties and the like. The term "molecular sieve" is derived from the ability of these zeolite materials to selectively adsorb molecules on the basis of their size and form. The various types of molecular sieves can be classified according to the size of the molecules that will be rejected (i.e. not adsorbed) by a particular sieve. A number of these zeolite materials are described, for example, in U.S. Patents Nos. 3,013,982–86, wherein they are also characterized by their composition and X-ray diffraction characteristics. In addition to their extensive use as adsorbents for hydrocarbon separation processes and the like, it has recently been found that crystalline alumino-silicate zeolites, particularly after cation exchange to reduce alkali metal oxide content, are valuable catalytic materials for various processes, particularly hydrocarbon conversion processes, e.g. hydrocracking.

The crystalline alumino-silicate zeolites contemplated as the starting materials in the present invention will have a structure similar to that of the mineral faujasite. Preferred zeolites will be of the synthetic faujasite variety, although natural faujasite is not intended to be excluded. These zeolites are characterized by uniform pore dimensions in the general range of about 6 to 15 A. in diameter. In the anhydrous form synthetic faujasite may be represented by the formula:

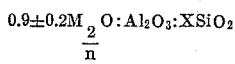

$$0.9 \pm 0.2 M_{\frac{2}{n}} O : Al_2O_3 : XSiO_2$$

wherein M is selected from the group consisting of hydrogen, hydrogen-containing cations such as ammonium ion, and metal cations; $n$ is its valence; and X has a value above about 2.5, preferably 3 to 7, more preferably 4 to 6. When synthetic faujasite is prepared by conventional methods, "M" in the above formula will usually be an alkali metal, such as sodium.

The processes for producing such crystalline synthetic zeolites are well known in the art. Typically, they involve crystallization from reaction mixtures containing: $Al_2O_3$ as sodium aluminate, alumina sol and the like; $SiO_2$ as sodium silicate and/or silica gel and/or silica sol; alkali metal oxide, e.g. sodium hydroxide, either free or in combination with the above components; and water. Careful control is kept over the alkali metal oxide concentration of the mixture, the proportions of silica to alumina and alkali metal oxide to silica, the crystallization period, etc., to obtain the desired product. While the actual formulation of the zeolite per se is not a subject of the present invention, the following conventional scheme for preparing a synthetic faujasite in the sodium form is set forth for purposes of completeness.

Colloidal silica or silica hydrosol is mixed with a solution of sodium hydroxide and sodium aluminate at ambient temperature. Suitable reactant molar ratios fall within the following ranges: $Na_2O/SiO_2$, 0.28 to 0.80; $SiO_2/Al_2O_3$, 4 to 40; $H_2O/Na_2O$, 15 to 60. The reaction mixture is preferably allowed to digest at ambient temperature for periods of up to 40 hours or more, or cooled below about 80° F., in order to aid crystallization, after which it is heated to and maintained at 180° to 250° F., e.g. 200° to 220° F., for a sufficient period to crystallize the product and to achieve maximum crystallinity, e.g. 24 to 200 hours or more, typically 50 to 100 hours. The crystalline sodium alumino-silicate zeolite having a faujasite structure is then separated from the aqueous mother liquor by decantation or filtration and washed. The zeolite is then ion-exchanged according to the procedures hereinafter to be described. For this purpose, it may be used either in the wet form or in a partially dried form.

Synthetic faujasite consists basically of a rigid three-dimensional crystalline framework of atoms of silicon, aluminum and oxygen, which form $SiO_4$ and $AlO_4$ tetrahedra. These tetrahedra are cross-linked by the sharing of oxygen atoms so that the ratio of oxygen atoms to the total of aluminum and silicon atoms is equal to 2. The electrovalence of each tetrahedra containing aluminum is balanced by the inclusion of a cation in the crystal; i.e. the structure must also contain a suitable cation to obtain electrical neutrality because the trivalent aluminum is in fourfold coordination within the crystalline structure. As mentioned this cation is typically an alkali metal cation, such as sodium, which is usually exchangeable with other cations by conventional ion exchange techniques. Dehydration of the zeolite by heating at high temperature results in the formation of crystals interlaced with interstitial channels of such size as to exclude larger diameter molecules and to admit entry to smaller diameter molecules. As a result, a highly effective adsorbent and catalyst or catalyst support is produced.

In order to fully comprehend the present invention it will first be necessary to further detail the crystal structure of the zeolites contemplated. The structure of synthetic faujasite may be determined by X-ray crystallographic analysis, as described, for example, in "The Structure of Synthetic Molecular Sieves"; J.A.C.S. 82, 1041 (1960). From such analysis, and the development of molecular models, it has been found that the primary building block of synthetic faujasite is a framework of the aforementioned $SiO_4$ and $AlO_4$ tetrahedral groups that closely resemble the main structural unit in the mineral sodalite and the ultramarines. This building block, which will be called a "sodalite unit," contains 24 (Si, Al) ions interconnected with 36 oxygen anions. The oxygen ions in this "sodalite unit" form 6 octahedrally positioned rings containing 4 oxygen ions and one set of cubically positioned or *two sets* of tetrahedrally positioned 6-element rings of oxygen ions. The sodalite units are arranged in tetrahedral coordination on *one set* of the tetrahedral positioned 6-element rings of oxygen ions. The 6-element rings of oxygen ions in one sodalite unit are joined to the 6-element rings of oxygen ions in the adjacent sodalite unit by 6 "bridge" oxygen ions. These 18 oxygen ions thus form a small hexagonal prismatic unit whose center will be termed the "bridge" position. By conventional X-ray crystallographic methods it has been shown that a Na-cation is located at this "bridge" position in the synthetic Na-form faujasite. Accordingly, the position of this cation will hereinafter be termed the "bridge" cation position, which position is accessible only through an opening which is approximately equal to the diameter of an oxygen ion (~2.8 A.).

Stacking of the sodalite units in tetrahedral configuration results in the formation of large adsorption cages by the voids which are left unoccupied by sodalite units. Access to each large adsorption cage is by means of four tetrahedrally positioned openings consisting of 12-element rings of oxygen ions. A portion of the walls of the large adsorption cage is composed of the *second set* of the aforementioned sets of tetrahedrally positioned 6-element rings of oxygen ions in each sodalite unit. In the synthetic Na-form faujasite, a Na-cation is located inside the large adsorption cage in close proximity to four of these 6-element rings of oxygen ions. Accordingly, the position of this cation will be termed the "cage" cation position, which position is readily accessible through the large 12-element rings of oxygen ions.

Both "bridge" and "cage" Na-cations are required to neutralize the negative charge resulting from trivalent aluminum being in fourfold coordination in synthetic faujasite. For a sodium-form synthetic faujasite having an $SiO_2/Al_2O_3$ ratio of 6, these positions will be completely occupied by Na-cations. As more Al is substituted for Si the extra Na-cations required will be distributed at random inside the sodalite units. For $SiO/Al_2O_3$ ratios higher than 6, fewer "cage" cations will be required.

The important distinctions existing between the "bridge" and the "cage" cation sites include (1) the bridge cation site is less accessible to ion-exchange than the cage cation site, (2) the bridge cation site is inaccessible to hydrocarbon feeds, and (3) because of its structural position the exact location of the bridge cation is more important to the structural stability of synthetic faujasite than is the position of the cage cation.

The exchange of Na-cations by other cations which have very different X-ray scattering powers (for example, hydrogen or silver) can be followed by conventional X-ray crystallographic methods. A 3-dimensional Fourier analysis enables the determination of the type of cation that has been preferentially exchanged; i.e. whether the cage Na-cations have been exchanged in preference to the bridge Na-cations. This type of analysis yields data in terms of the density of electrons per cubic angstrom. Thus, for a Na-form synthetic faujasite, in which each "bridge" cation position and each "cage" cation position are occupied by one Na-cation, the electron density at these positions was found to be 1.96 and 2.17 electron/$A.^3$ respectively.

Throughout the specification and claims the terms "bridge" and "cage" (positions or cations) are intended to have the above-defined meanings.

One aspect of the present invention relates to the discovery that the relative exchangeability characteristics of the two types of cations (i.e. the "bridge" and "cage" types) differ, and that the ultimate stability of the exchanged crystalline zeolite structure depends upon which type of cation is exchanged. The prior art has generally realized that these alkali metal cations, e.g. sodium cations, must be replaced with an exchangeable cation in order that they may be successfully used, for example, in hydrocarbon conversion processes where sodium is a known poison. However, the exchange treatment has generally been carried out indiscriminately, without regard to the above distinction between bridge and cage cations. It has now been discovered that such indiscriminate reduction in sodium content will reduce the stability of the crystalline zeolite structure if the exchange is carried to the point where the bridge cations are replaced along with the cage cations. It has moreover been discovered that a selective and partial reduction in sodium ion content, which results in replacement of only the cage sodium cations, will achieve maximum crystalline stability without adversely affecting catalyst activity and, moreover, will often surprisingly increase such activity. The key to this surprising discovery thus resides in the aforementioned distinctions between the bridge and cage cations. As mentioned, the bridge cations are located in positions which are relatively inaccessible to hydrocarbon feeds so that their removal is unnecessary so far as catalytic effects are concerned. Furthermore, their presence in the zeolite enhances structural stability. The selective replacement of the cage cations is, therefore, to be clearly distinguished from indiscriminate ion exchange procedures which invariably replace both the cage and the bridge cations, with a resulting marked reduction in the stability of the crystal structure.

The essence of the present invention resides, therefore, in the discovery that ion-exchanged crystalline zeolites, particularly the sodium faujasite variety, having a high degree of activity and retained stability can be produced by selectively replacing or substituting the cage alkali metal cations with a hydrogen-containing cation, without substantially affecting the presence or position of the bridge alkali metal cations. The term "hydrogen-containing cation" is intended to include hydrogen ion, ammonium ion, etc.

poison in hydrocarbon conversion processes is not a sign

This selective replacement of cage cations does not materially reduce the catalytic activity of catalysts formed from the resulting zeolites, and often surprisingly increases such activity. Moreover, the fact that sodium acts as a poison in hydrocarbon conversion processes is not a significant factor with respect to the remaining bridge sodium cations, since, unlike the cage cations, they do not contact the hydrocarbon feed, and therefore need not be replaced.

The synthetic faujasite products of the present invention will thus have the formula hereinbefore set forth except that "M" represents a mixture of two or more types of cations, one of which being an alkali metal cation which is predominantly in the "bridge" position, another of which being a hydrogen-containing cation which is predominantly in the "cage" position. These zeolites, which are characterized by partial and selective replacement of cage alkali metal cations without substantial replacement of bridge alkali metal cations, may be further defined by prescribing the electron densities occurring at the "bridge" and "cage" positions as determined by X-ray and Fourier analyses. Specifically, they will be characterized by having an electron density at the "bridge" position of from about 1.0 to about 2.0 electrons per cubic angstrom. As long as these limits are met, the cage cations can be substantially completely replaced without affecting the stability of the zeolite. The electron density at the "cage" position will, therefore, preferably approach 0 and should be less than about 75%, preferably less than about 25%, of its original value prior to ion exchange; i.e., the value corresponding to essentially complete occupancy of the "cage" position with alkali metal ion. For maximum stability and activity, the electron density at the "bridge" position should preferably be at a maximum, and that at the "cage" position should preferably be at a minimum.

Generally, the process of the invention comprises treating the crystallized synthetic faujasite with ion exchange solution which is capable of selectively replacing the cage alkali metal cations, e.g. sodium cations, while leaving the bridge cations substantially intact. This may be accomplished by the following ion exchange procedures, which are to be considered as preferred embodiments of the present invention. However, the generic concept of the invention, i.e. that crystalline synthetic faujasite having improved stability and catalytic activity may be produced by selectively replacing the cage alkali metal cations, should not be construed as being limited to any of these preferred embodiments.

One preferred procedure involves contacting the zeolite with a suitable aqueous ionic solution which is capable of selectively exchanging its cations with the cage cations of the zeolite. It has been found that only certain ionic solutions possess this desirable capability, and that while the replacement cation must be chosen with care, the choice of the anion with which it is associated is surprisingly of equal, if not controlling, importance. For example, it has been found that ammonium ion is eminently suitable for this selective exchange, but only when it is associated with certain anions; e.g. the carbonate and the nitrate anion. Treatment with ammonium carbonate or ammonium nitrate solutions will readily accomplish the desired selective exchange of cage sodium cations for ammonium ions. (The ammonium ions, upon calcination, are subsequently decomposed to hydrogen ions, with concurrent liberation of ammonia.) Similar treatment with ammonium chloride, ammonium hydroxide, or ammonium sulfate has been found unavailing, in that it either preferentially replaces the bridge alkali metal cations or indiscriminately replaces both the bridge and the cage alkali metal cations. Thus, a highly efficient and convenient method is provided for selectively replacing the cage sodium cations in crystalline synthetic faujasite.

The ion-exchange is simply carried out in conventional manner by slurrying the zeolite in an exchange solution of the appropriate ammonium salt (e.g. ammonium carbonate or nitrate). The ion-exchange treatment is repeated, with the zeolite being filtered between successive treatments, until the desired degree of exchange has been achieved. For example, a typical sodium synthetic faujasite having a silica-to-alumina mole ratio of about 5:1 will normally have a total sodium oxide content before ion-exchange of about 13.4% wt. percent. Successive treatments with ammonium carbonate or ammonium nitrate solution until the cage sodium cations have been selectively replaced, will reduce this soda level to typical values of about 3.4 to 4.2 wt. percent. Similarly, the number of ion-exchange treatments required will vary with the exchange solution being used, the temperature, and the exchange time. For the ammonium carbonate and the ammonium nitrate solutions, these variables will be adjusted so that about 3 to 6 treatments will be sufficient. The temperature at which the ion-exchange treatment is performed will preferably be about ambient temperature, although temperatures of 50 to 200° F. may be employed. Concentrations of the ammonium salts in the exchange solutions may range from about 1 to 30 wt. percent.

Another preferred procedure for producing zeolites characterized by the selective replacement of the cage alkali metal cations involves the almost complete replacement of both the bridge and cage cations followed by selective reintroduction of only the bridge cations. In this procedure, the initial total alkali metal content of the unmodified zeolite (synthetic faujasite) is first reduced to a value below that which corresponds to replacement of only the cage cations (e.g. about 1 to 2 wt. percent $Na_2O$). These sodium contents may be readily obtained by any of a number of conventional ion-exchange procedures using, for example, such ion-exchange solutions as ammonium chloride, ammonium sulfate, etc. The result of such treatment is either the undesirable preferential replacement of the bridge sodium cations or indiscriminate replacement of both the cage and bridge cations. After such replacements, it has been discovered (and forms a part of the present invention) that treatment of the resulting zeolite with alkali metal hydroxide, e.g. sodium hydroxide, will selectively reintroduce the bridge alkali metal cations without reintroducing the cage alkali metal cations. This "bridge cation reintroduction" can be accomplished by contacting the zeolite with dilute caustic solution for a sufficient time to reintroduce the bridge sodium cations without reintroducing the cage sodium cations. One exchange with sodium hydroxide solution (3.5 g. in 400 cc.) at ambient temperature, for less than about one hour, has been found satisfactory for this purpose.

After the above-described selective replacement of the cage alkali metal cations with ammonium ions, or the exhaustive replacement of both the bridge and the cage cations with ammonium ions followed by selective reintroduction of the bridge alkali metal cations, the resulting zeolite can be used as is (after suitable drying, calcination, etc.) or after treatment by other conventional procedures depending upon its intended end use. When the zeolite is used "as is," the ammonium cation used in the selective ion-exchange will usually be decomposed to the hydrogen form by calcination at temperatures up to about 1000° F.

The selectively ion-exchanged zeolites of the invention may also be modified for such applications as hydrocracking by impregnation with a suitable hydrogenating metal. In this case, the zeolites are initially selectively decationized (to remove only the cage cations) by the procedures hereinbefore described and then treated with a suitable solution of a hydrogenating metal salt or metal ammonium complex. Suitable hydrogenating metals include the platinum group metals, e.g. palladium, platinum and rhodium, as well as other metals such as molybdenum, chromium, vanadium, cobalt, nickel, copper, silver and manganese. The preferred metals will be the platinum group metals, such as platinum or palladium, which may be composited with the ion-exchanged zeolite by treatment with a solution of a suitable platinum group metal compound, such as ammonium chloroplatinate, ammoniacal palladium chloride, etc. The amount of hydrogenating metal in the finished catalyst will generally be between about 0.01 to 5.0 wt. percent, preferably 0.1 to 3.0 wt. percent, based on dry zeolite. After deposition of the platinum group metal, the catalyst is then dried at a temperature between about 200 and 350° F., at which temperature the ammonium form of the zeolite preferably does not decompose and at which its crystallinity is essentially unchanged. Following the drying step, the catalyst is calcined in a dry atmosphere by gradually increasing the temperature over several hours up to about 800 to 1000° F. and holding at this temperature level for about 1 to 5 hours. Superior hydrocracking catalysts having high activity levels are produced in this manner from the selectively-exchanged zeolites prepared in accordance with the present invention. Suitable hydrocracking conditions include a temperature of about 500 to 1000° F., preferably 700 to 950° F.; a pressure of about 500 to 3000 p.s.i.g., preferably 800 to 2000 p.s.i.g.; a space velocity of 0.2 to 20, preferably 1 to 10 v./v./hr.; and a hydrogen rate of about 500 to 20,000, preferably 1000 to 10,000, s.c.f. per barrel of oil feed. A wide variety of hydrocarbon feeds may be employed; e.g. petroleum, and fractions therefrom.

The invention will be further understood by reference to the following examples, which are not intended to be limiting.

*Example 1*

The sodium form of synthetic faujasite was prepared by the following typical procedure and served as the starting material for subsequent ion-exchange treatments to illustrate the benefits of the present invention. A solution of (1) commercial sodium aluminate containing 38 wt. percent $Na_2O$, 38 wt. percent $Al_2O_3$, and 24 wt. percent $H_2O$, and (2) sodium hydroxide containing 97% NaOH, in (3) water was added to (4) a commercially available aqueous sol of colloidal silica containing about 30 wt. percent $SiO_2$ and having a weight ratio of soda-to-silica equal to 1:285 ("Ludox" solution supplied by E. I. du Pont de Nemours & Co.), under rapid stirring conditions at ambient temperature, e.g. about 75° F. Stirring was continued until the mixture was essentially homogeneous. The homogeneous reaction mixture was allowed to digest at ambient temperature for 1 to 2 hours and was then heated to and maintained at about 195 to 210° F., until the product had sufficiently crystallized. (The crystallization period was determined by the length of time necessary to produce maximum crystallinity of product, as indicated by periodic withdrawal of a sample and X-ray diffraction analysis.) The crystallization step was terminated by quenching the reaction mixture with large volumes of cold water. The crystalline product was then separated from the mother liquor by filtration, thoroughly water-washed until the wash water had a pH of about 9.3, and finally oven-dried at a temperature of about 130° C.

The silica-to-alumina ratio of the zeolite product depends upon the proportions of the above ingredients used. To produce a synthetic faujasite having the molar formula 0.99 $Na_2O$:1.0 $Al_2O_3$:4.2 $SiO_2$, the following amounts of ingredients were used: 6.870 grams NaOH, 1,513 grams sodium aluminate, 37.6 kg. 30% silica sol, and 27 liters water. To produce a product having a silica-to-alumina ratio of about 5.3, the following amounts of ingredients were used: 6,000 grams NaOH, 1,700 grams sodium aluminate, 38.6 kg. 30% silica sol, and 21.5 liters water.

The sodium synthetic faujasites prepared by the above procedures had total sodium contents prior to ion-exchange of about 13.7 to 14.0 wt. percent $Na_2O$.

The above synthetic faujasite samples were ion-exchanged to partially reduce their sodium content to a level corresponding to the selective replacement of cage sodium cations only, in accordance with the present invention, as illustrated by the following examples.

*Example 2*

A series of runs was performed using a sodium synthetic faujasite having an initial sodium content of 13.7 wt. percent $Na_2O$ and a silica-to-alumina ratio of 4.2, as prepared by the procedure of Example 1. 1000 grams of an oven-dried sample were slurried in an aqueous solution containing 675 grams ammonium carbonate in 1500 ml. $H_2O$, at 80° F. for 4½ hours. This exchange treatment was repeated seven times. After the final exchange, the zeolite was washed free of carbonate ion, oven-dried at 230° F., and analyzed for $Na_2O$ content. Similar runs were performed using an ammonium chloride solution containing ammonium hydroxide to reduce its acidity (1 liter of a solution containing 133 grams $NH_4Cl$ and 133 ml. 28% $NH_4OH$ per 100 grams of dried zeolite). Another series was performed with $NH_4OH$ (28%) alone to demonstrate its ineffectiveness as an exchange medium. The results of these runs are summarized in the following table.

TABLE I.—CATIONIC EXCHANGE OF SYNTHETIC FAUJASITE EFFECTIVENESS OF AMMONIUM COMPOUNDS FOR SODA REPLACEMENT

| Test No. | Number of Exchanges | $(NH_4)_2CO_3$ Exchange, Wt. Percent $Na_2O$ | $NH_4Cl$ ($+NH_4OH$) Exchange, Wt. Percent $Na_2O$ | $NH_4OH$ Exchange, Wt. Percent $Na_2O$ |
|---|---|---|---|---|
| 1 | 0 | 13.7 | 13.9 | 13.9 |
| 2 | 1 | 5.0 | 5.3 | 11.7 |
| 3 | 2 | 5.0 | 3.1 | |
| 4 | 3 | 3.9 | 2.2 | |
| 5 | 5 | 3.4 | 0.8 | |
| 6 | 7 | 3.4 | | |

The above data show that the ammonium carbonate exchange produced a minimum constant $Na_2O$ content of about 3.4 wt. percent after about 5 exchanges and that further exchanges up to 7 were unable to remove additional soda. However, the exchanges performed with ammonium chloride solutions reduced the soda content to as low as 0.8 wt. percent. The highly selective character of ammonium carbonate solution is thus demonstrated. The theoretical amount of soda corresponding to the presence of bridge sodium cations alone is about 3.4 to 4.2 wt. percent for synthetic faujasites having silica-to-alumina ratios between about 4.2 and 5.3. It may be concluded, therefore, that the ammonium carbonate treatment selectively and substantially removed the cage sodium cations while leaving the bridge cations substantially intact; whereas the ammonium chloride-hydroxide treatment indiscriminately removed both the bridge and cage cations. This conclusion will be further borne out in the following examples.

It is also to be noted that the ammonium hydroxide exchange was essentially ineffective in reducing the sodium content of the zeolite.

*Example 3*

Various samples of the synthetic faujasite products of Example 1 were subjected to ion-exchange treatment with solutions of ammonium carbonate, ammonium chloride-hydroxide, ammonium nitrate, ammonium sulfate, and ammonium chloride; and then treated with palladium chloride to form hydrocracking catalysts. The following tables summarize the results of these runs, including the silica-to-alumina ratio of the zeolite, the temperature and number of exchange treatments, the wt. percent $Na_2O$ in the original and exchange zeolite, the electron densities at the "bridge" and "cage" sodium cation positions, the relative hydrocracking activity of the hydrocracking catalysts formed from these zeolites, and the relative stability of these catalysts. The electron density values were determined by X-ray diffraction analysis and Fourier analysis.

The zeolites prepared in Example 1 were modified to form hydrocracking catalysts by ion-exchanging in accordance with the conditions shown in the following two tables, in order to produce the "ammonium form" of the zeolite. They were then composited with 0.5 wt. percent palladium by slurrying in an ammoniacal palladium chloride solution, i.e. $Pd(NH_3)_4Cl_2$, having a concentration calculated to produce about a 0.5 wt. percent palladium on zeolite catalyst, based on dry zeolite. (In this treatment, substantially all of the palladium becomes impregnated within the zeolite.) After ammonium ion-exchange and palladium impregnation the resulting palladium on zeolite catalysts were oven-dried at a temperature of about 230 to 300° F. and then pelleted to form particles suitable for use in a fixed-bed hydrocracking reactor (e.g. ⅛-inch x ⅛-inch pellets). The sized pellets were then calcined by heating at about 400 to 500° F., followed by slow heating to about 850 to 1000° F., to thereby liberate ammonia, dehydrate the zeolite, and activate the catalyst for use in the fixed-bed hydrocracking runs.

The hydrocracking catalyst activity was determined as follows. The fixed-bed reactor was filled with the required quantity of the calcined material and the catalyst was reduced with hydrogen preceding the hydrocracking evaluation. Hydrocracking activity was determined as the pseudo first order rate constant relative to that of a similarly activated reference standard catalyst which was a 0.5 wt. percent palladium on the hydrogen form of synthetic faujasite having a silica-to-alumina mole ratio of 5.5 and containing 2.0 wt. percent $Na_2O$. The activity of the reference standard catalyst was measured when between about 150 and 400 volumes of low nitrogen (2 p.p.m.) cycle oil containing 1% sulfur (as $CS_2$) had been passed over the catalyst at 3 v./v./hr., 1100 p.s.i.g., 5700 s.c.f./bbl. hydrogen, and 600° F. The values expressed in the following table are relative to this standard catalyst.

The relative stability values shown in the following table represent the crystallinity of the catalyst after calcination and air exposure at 80° F., as compared to the crystallinity of the standard catalyst, which was taken as having a crystallinity of 100. Crystallinity is determined by comparing 10 strong lines in the X-ray diffraction patterns of the standard and unknown samples.

The results of the various ion-exchange treatments are shown in Table II, with the exchange conditions for each treatment summarized in Table III.

TABLE II.—CATIONIC EXCHANGE OF SYNTHETIC FAUJASITE SELECTIVE REPLACEMENT OF SODIUM WITH AMMONIUM IONS

| Test No. | Zeolite $SiO_2/Al_2O_3$ Mole Ratio | Ammonium Exchange Solution | Exchanged Zeolite Percent $Na_2O$ | Electron Density [1] Electrons/A.[3] | | Relative Hydrocracking Activity [2] | Relative Stability [3] |
|---|---|---|---|---|---|---|---|
| | | | | "Bridge" | "Cage" | | |
| 1 | 4.2 | None | 14.0 | 1.96 | 2.17 | | 82 |
| 2 | 4.2 | Carbonate | 3.4 | 1.23 | 0.09 | 120 | |
| 3 | 4.2 | Chloride-Hydroxide | 1.6 | 0.44 | 1.20 | 26 | |
| 4 | 4.2 | {Step 1: Chloride-Hydroxide | 1.6 | 0.44 | 1.20 | 26 | 21 |
| | | Step 2: Sodium Hydroxide [5] | 2.2 | 1.30 | 0.43 | 112 | 73 |
| 5 | 5.3 | None | 13.7 | 1.90 | 0.77 | | |
| 6 | 5.3 | Nitrate | 4.2 | 1.81 | 0.52 | | |
| 7 | 5.3 | Sulfate | 4.3 | 0.41 | 0.81 | | |
| 8 | 5.3 | Chloride | 4.2 | 0.42 | 1.55 | | |
| 9 | 5.3 | ...do | 4.0 | 0.17 | 0.85 | | |
| 10 | 5.3 | Chloride-Hydroxide | 3.8 | 0.93 | 1.14 | | |
| 11 | 5.5 | Reference Catalyst [4] | 2.0 | 0.23 | 0.62 | 100 | 60 |

[1] After calcining to convert ammonium form to hydrogen form; containing no palladium.
[2] After palladium impregnation and calcination.
[3] Degree of crystallinity after calcination.
[4] Standard reference hydrocracking catalyst: synthetic faujasite containing 0.5 wt. percent palladium and 2.0 wt. percent $Na_2O$, $SiO_2/Al_2O_3=5.5$.
[5] Sodium reintroduction.

TABLE III.—EXCHANGE CONDITIONS

| Test No. | Exchange Treatment | Temperature, °F. | No. of Fresh Solutions | Total Exchange Time, Hours |
|---|---|---|---|---|
| 1 | None | | | |
| 2 | 680 g. $(NH_4)_2CO_3$/2 liter $H_2O$/kg. Na-Zeolite. | 80 | 5 | 22.5 |
| 3 | 3.03 kg. $NH_4Cl$+3.03 liter 28% $NH_4OH$/22.7 liter $H_2O$/3.3 kg. Na-Zeolite. | 155 | 5 | 10 |
| 4 | {Step 1: 13.3% $NH_4Cl$, 3.7% $NH_4OH$, 83.0% $H_2O$. | 150–160 | 5 | 10 |
| | Step 2: 3.5 g. NaOH, 400 cc. solution. | 80 | 1 | <1 |
| 5 | None | | | |
| 6 | 1,347 g. $NH_4NO_3$/2.4 liter $H_2O$/kg. Na-Zeolite. | 80 | 3 | 1.5 |
| 7 | 1,115 g. $(NH_4)_2SO_4$/2.4 liter $H_2O$/kg. Na-Zeolite. | 80 | 6 | 3 |
| 8 | 900 g. $NH_4Cl$/2.4 liter $H_2O$/kg. Na-Zeolite. | 80 | 3 | 1.5 |
| 9 | 900 g. $NH_4Cl$/2.4 liter $H_2O$/kg. Na-Zeolite. | 150 | 3 | 1.5 |
| 10 | 900 g. $NH_4Cl$+900 cc. 28% $NH_4OH$/1.5 liter $H_2O$/kg. Na-Zeolite. | 80 | 4 | 5.5 |
| 11 | None | | | |

As clearly shown in the above Table II, selective exchange of the cage sodium cations with ammonium cation is dependent upon the anion with which it is associated. Of the various ammonium salts used in the exchanges shown, only the carbonate and the nitrate salts demonstrated the desired selective removal of the cage sodium cations. This is indicated by the results of Tests 2 and 6, which show lower electron density values at the "cage" position than at the "bridge" position after ion-exchange. The tests performed with the chloride, chloride-hydroxide, and sulfate, however, i.e. Tests 3, 7, 8, 9 and 10, all show higher electron density values at the "cage" position than at the "bridge" position, thus indicating an undesirable preference for the bridge cations as well as indiscriminate exchange.

More importantly, the data show a marked effect upon the relative hydrocracking activity and relative stability of the catalysts formed from the ion-exchange synthetic faujasite products. When the electron density at the "bridge" position is maintained between about 1 and 2 electrons per A.$^3$, and the electron density at the "cage" position is minimized, these desirable properties are maximized. When these limits are not met, however, the relative hydrocracking activity and stability fall. Thus, high hydrocracking activity was obtained with the carbonate-treated zeolite of Test 2 which had a "bridge" electron density within this prescribed range and a low "cage" electron density; whereas the chloride-hydroxide treated zeolite of Test 3, which had a low "bridge" electron density and a high "cage" electron density exhibited very low hydrocracking activity.

The result of Test 4 is again indicative of the advantages to be gained from maintaining the "bridge" electron density within the prescribed range of about 1 to 2 electrons per A.$^3$. In Test 4, Step 1, indiscriminate exchange with ammonium chloride-hydroxide solution reduced the "bridge" electron density below these critical limits, with a correspondingly high "cage" electron density, and thereby produced low hydrocracking activity and low stability. However, when the bridge sodium ions were reintroduced into the zeolite in Step 2, as indicated by the rise in the "bridge" electron density to a value of 1.3, a remarkable improvement in both the hydrocracking activity and relative stability was observed. It is apparent that a redistribution of the cage sodium cations also occurred in Step 2.

It may be concluded from all of the above data that the presence of the bridge sodium cations is essential to the maintenance of zeolite crystal structure stability, and that replacement of these cations with ammonium or hydrogen ions will weaken the structure and result in a relatively unstable product. By means of the present invention, which involves the selective replacement of only the cage sodium cations, maintenance of the stability of the zeolite structure is ensured and, at the same time, the catalytic activity of catalysts formed from such zeolites is improved. A number of means may be employed to accomplish this selective replacement of the cage sodium cations, two of which have been demonstrated; namely: (1) utilization of an ammonium salt which is capable of accomplishing this selective removal, e.g. ammonium carbonate and ammonium nitrate; and (2) exhaustive exchange to remove both bridge and cage sodium cations followed by reintroduction of only the bridge sodium cations using a suitable source of sodium, such as sodium hydroxide. It will be realized that the first of these means, i.e. utilization of either ammonium carbonate or ammonium nitrate solutions, has the advan-

What is claimed is:

1. A crystalline alumino-silicate zeolite having a faujasite structure composed of a crystal framework characterized by cage and bridge cation positions as herein described and comprising silicon ions, aluminum ions, oxygen ions, alkali metal ions, and hydrogen-containing ions, said alkali metal ions and hydrogen-containing ions predominantly occupying the bridge and cage positions respectively, wherein the electron density at the bridge position is about 1.0 to 2.0 electrons per cubic angstrom and the electron density at the cage position is less than about 75% of the value corresponding to complete occupancy of the cage position with alkali metal ion.

2. The zeolite of claim 1, wherein said alkali metal is sodium.

3. The zeolite of claim 2, wherein the electron density at the cage position is less than about 25% of the value corresponding to complete occupancy of the cage position with alkali metal ion.

4. A catalyst composition comprising the zeolite of claim 1 composited with a hydrogenating metal.

5. A catalyst composition comprising the zeolite of claim 3 composited with about 0.01 to 5.0 wt. percent palladium.

6. The zeolite of claim 1 having a silica-to-alumina mole ratio above about 2.5.

7. The zeolite of claim 1 having a silica-to-alumina mole ratio of 3 to 7.

8. The zeolite of claim 3 having a silica-to-alumina mole ratio of 4 to 6.

9. The catalyst composition of claim 4 wherein said hydrogenating metal is selected from the group consisting of palladium, platinum, rhodium, molybdenum, chromium, vanadium, cobalt, nickel, copper, silver and manganese.

10. The catalyst composition of claim 4 wherein said hydrogenating metal is a platinum group metal.

11. A process for hydrocracking hydrocarbons which comprises contacting said hydrocarbons with a hydrocracking catalyst at a temperature of about 500 to 1,000° F., a pressure of about 500 to 3,000 p.s.i.g., a space velocity of 0.2 to 20 v./v./hr., in the presence of hydrogen at a rate of about 500 to 20,000 s.c.f. per barrel of feed, said hydrocracking catalyst comprising a hydrogenating metal and a crystalline alumino-silicate zeolite having a faujasite structure composed of a crystal framework characterized by cage and bridge cation positions as herein described and comprising silicon ions, aluminum ions, oxygen ions, alkali metal ions, and hydrogen-containing ions, said alkali metal ions and hydrogen-containing ions predominantly occupying the bridge and cage positions respectively, wherein the electron density at the bridge position is about 1.0 to 2.0 electrons per cubic angstrom and the electron density at the cage position is less than about 25% of the value corresponding to complete occupancy of the cage position with alkali metal ion.

12. A process for selectively exchanging alkali metal cations located at the bridge and cage positions in the crystal framework of a crystalline alumino-silicate zeolite having a faujasite structure, said zeolite having a silica-to-alumina ratio above about 2.5, which process comprises contacting said zeolite with an ammonium carbonate solution, said solution being capable of replacing the alkali metal cations located at the cage position in said framework with hydrogen-containing cations while leaving the alkali metal cations located at the bridge position substantially intact.

13. A process for selectively exchanging alkali metal cations located at the bridge and cage positions in the crystal framework of a crystalline alumino-silicate zeolite having a faujasite structure, said zeolite having a silica-to-alumina ratio above about 2.5, which process comprises contacting said zeolite with an ammonium nitrate solution, said solution being capable of replacing the alkali metal cations located at the cage position in said framework with hydrogen-containing cations while leaving the alkali metal cations located at the bridge position substantially intact.

14. A method of improving the catalytic and stability properties of a crystalline alumino-silicate zeolite having a faujasite structure and characterized by having sodium cations located at both the bridge and cage positions within its crystal framework, which method comprises contacting said zeolite with an ammonium nitrate solution to thereby substitute hydrogen-containing cations for the sodium cations located at the cage position while leaving the sodium cations located at the bridge position substantially intact.

15. A method of improving the catalytic and stability properties of a crystalline alumino-silicate zeolite having a faujasite structure and characterized by having sodium cations located at both the bridge and cage positions within its crystal framework, which method comprises contacting said zeolite with an ammonium carbonate solution to thereby substitute hydrogen-containing cations for the sodium cations located at the cage position while leaving the sodium cations located at the bridge position substantially intact.

16. A method of improving the catalytic and stability properties of a crystalline alumino-silicate zeolite having a faujasite structure and characterized by having sodium cations located at both the bridge and cage positions within its crystal framework, which method comprises substituting hydrogen-containing cations for the sodium cations located at the cage position while leaving the sodium cations located at the bridge position substantially intact, said substitution being accomplished by first contacting said zeolite with a cationic solution capable of replacing the sodium cations located at both the bridge and cage positions, and subsequently contacting said zeolite with a dilute sodium hydroxide solution to thereby reintroduce sodium cations into the bridge position.

17. A method of improving the catalytic and stability properties of a crystalline alumino-silicate zeolite having a faujasite structure and characterized by having sodium cations located at both the bridge and cage positions within its crystal framework, which method comprises substituting hydrogen-containing cations for the sodium cations located at the cage position while leaving the sodium cations located at the bridge position substantially intact, said substitution being accomplished by first contacting said zeolite with a cationic solution selected from the group consisting of ammonium chloride, ammonium sulfate, ammonium hydroxide and mixtures thereof, said cationic solution being capable of replacing the sodium cations located at both the bridge and cage positions, and subsequently contacting said zeolite with a dilute sodium hydroxide solution to thereby reintroduce sodium cations into the bridge position.

References Cited by the Examiner

UNITED STATES PATENTS 3,140,251 7/1964 Plank et al. _____ 208—120
3,140,253 7/1964 Plank et al. _____ 208—120

DELBERT E. GANTZ, *Primary Examiner.*
ABRAHAM RIMENS, *Assistant Examiner.*